United States Patent Office 3,348,859
Patented Oct. 24, 1967

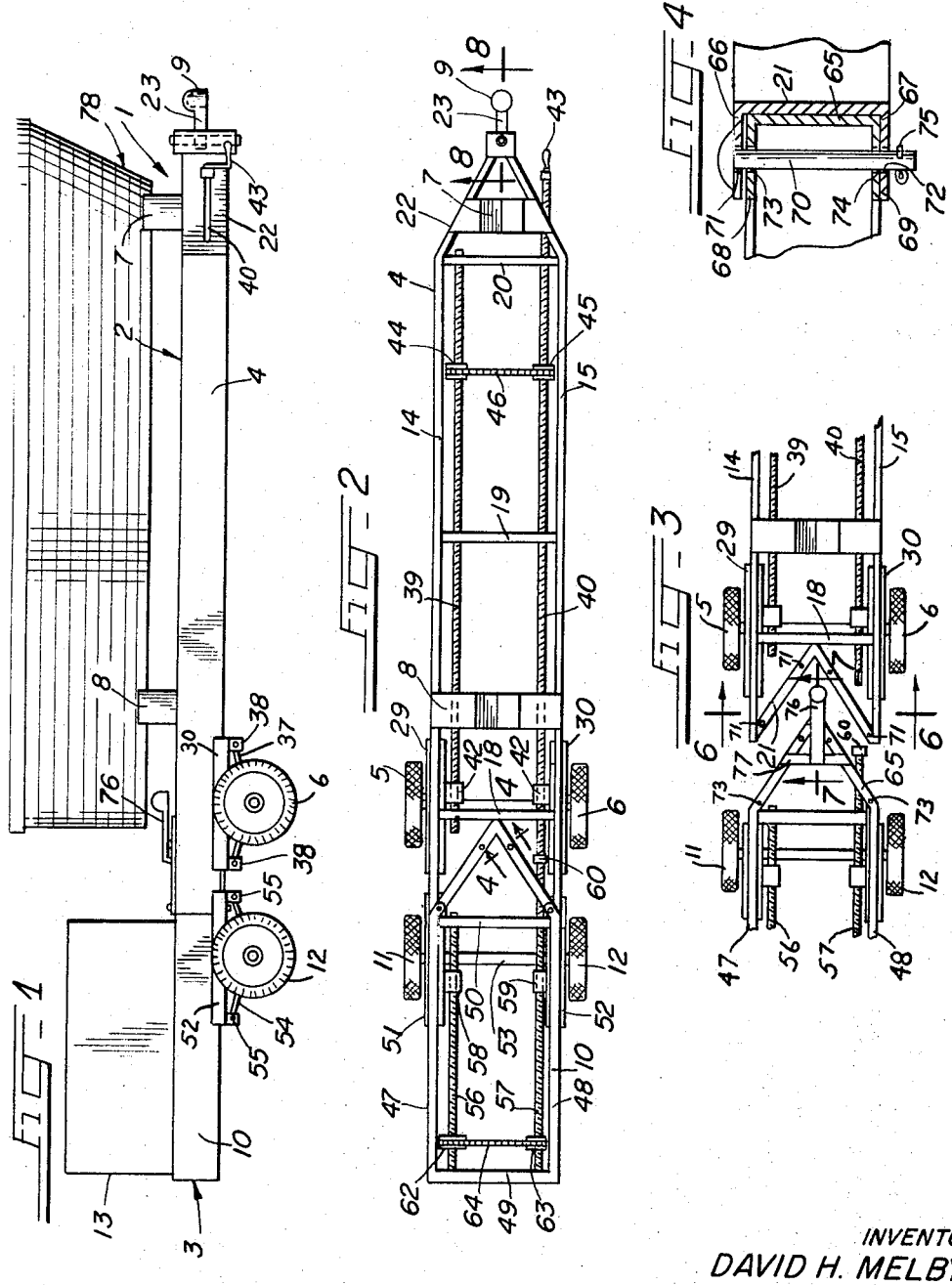

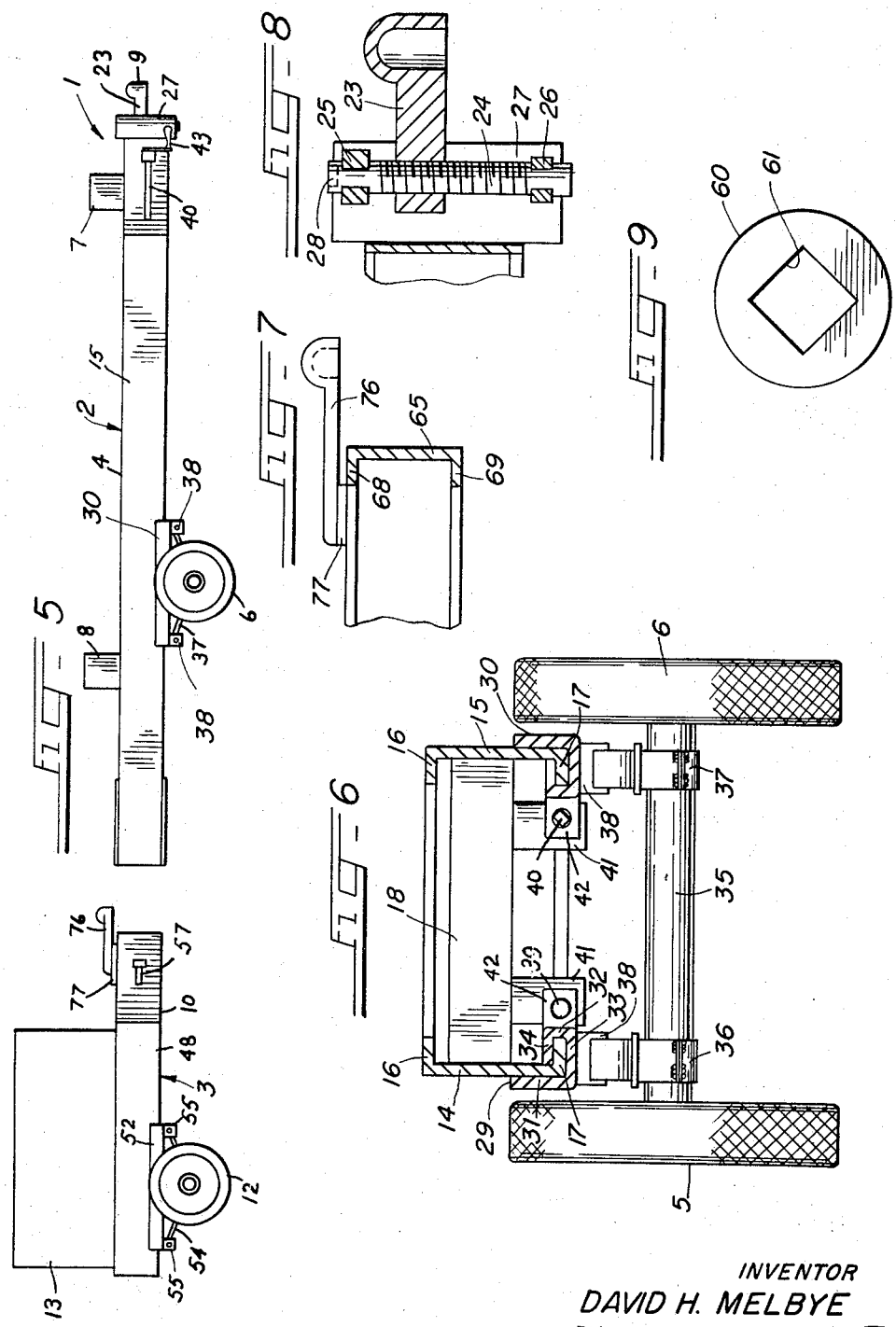

3,348,859
TOWING DEVICE EMBODYING TWO TRAILERS
David H. Melbye, 4513 W. 101st St.,
Oak Lawn, Ill. 60453
Filed May 24, 1965, Ser. No. 458,173
3 Claims. (Cl. 280—415)

ABSTRACT OF THE DISCLOSURE

A towing device embodying two trailers, each having a frame and being independently towable behind an automobile, the frames being adapted to be secured together to afford a rigid single trailer.

---

This invention relates to towing devices and, more particularly, to towing devices which are particularly well adapted for towing behind automobiles, and the like.

It is a primary object of the present invention to afford a novel towing device whereby a plurality of things, such as, for example, a boat and camping equipment may be towed in a novel and expeditious manner.

Another object of the present invention is to afford a novel towing device of the aforementioned type wherein the parts thereof are constituted and arranged in a novel and expeditious manner effective to optionally afford a single trailer for hauling such a plurality of things, or a plurality of separate trailers for independently hauling individual ones of such things.

Camping trailers, such as, for example, the camping trailer shown in my United States Letters Patent No. 3,149,876, issued Sept. 22, 1964, have been heretofore known in the art. Also, trailers for hauling boats, known in the trade as "boat trailers," have been heretofore known in the art. However, heretofore, it has not been practical to simultaneously haul a camping trailer and a boat trailer of the type heretofore known.

Trailers, such as the trailers shown in the William C. Gile United States Patent No. 3,881,023, issued Apr. 7, 1959, have been heretofore known in the art wherein a tent, or the like, and a boat could be simultaneously carried. However, these trailers have been special trailers which remained of the same size irrespective of whether the tent, the boat, or both were being hauled.

It is an important object of the present invention to afford a novel trailer whereby a boat and sleeping or living accommodations, such as a tent, may be carried simultaneously, and which trailer affords smaller individual trailers for hauling a boat or such sleeping and living accommodations, separately, if so desired.

Another object of the present invention is to afford a novel trailer embodying separable trailer portions, wherein the parts are so constituted and arranged that when they are assembled to afford a combination trailer of the aforementioned type for hauling a plurality of things, the separable trailer portions thereof are connected together in tandem in a novel and expeditious manner.

An object ancillary to the foregoing is to enable the aforementioned separable trailer portions to be secured together in a novel and expeditious manner effective to afford a single trailer wherein the separable trailer portions thereof are releasably secured together in tandem in immovable relation to each other.

Yet another object of the invention is to afford a novel trailer of the aforementioned type wherein the wheels thereof may be adjusted to different positions to accommodate different load conditions.

A further object is to afford a novel trailer of the aforementioned type wherein such adjustment of the position of the wheels thereof may be accomplished in a novel and expeditious manner.

Another object of the present invention is to afford a novel towing unit of the aforementioned type which is practical and efficient in operation, and which may be readily and economically produced commercially.

Other and further objects of the present invention will be apparent from the following description and claims and are illustrated in the accompanying drawings which, by way of illustration, show a preferred embodiment of the present invention and the principles thereof and what I now consider to be the best mode in which I have contemplated applying these principles. Other embodiments of the invention embodying the same or equivalent principles may be used and structural changes may be made as desired by those skilled in the art without departing from the present invention and the purview of the appended claims.

In the drawings:

FIG. 1 is a side elevational view of a towing unit embodying the principles of the present invention, showing the two separable trailer portions thereof secured together to afford a single trailer;

FIG. 2 is a top plan view of the trailer unit shown in FIG. 1, with certain parts removed to show underlying parts;

FIG. 3 is a fragmentary top plan view similar to FIG. 2, but showing the two trailer portions in separated relation to each other;

FIG. 4 is an enlarged, detail sectional view taken substantially along the line 4—4 in FIG. 2;

FIG. 5 is a side elevational view similar to FIG. 1, but showing the two trailer portions disposed in separated relation to each other;

FIG. 6 is an enlarged, detail sectional view taken substantially along the line 6—6 in FIG. 3;

FIG. 7 is an enlarged detail sectional view taken substantially along the line 7—7 in FIG. 3;

FIG. 8 is an enlarged detail sectional view taken substantially along the line 8—8 in FIG. 2; and FIG. 9 is an enlarged front elevational view of a coupling member embodied in the rear trailer portion shown in FIGS. 2 and 3.

A towing device affording a trailer 1, embodying the principles of the present invention, is shown in the drawings to illustrate the presently preferred embodiment of the present invention.

The trailer 1 embodies a front trailer portion 2 and a rear trailer portion 3, which, as will be discussed in greater detail presently, may be connected together to afford a single trailer, as shown in FIG. 1, or may be disconnected to afford two separate trailers, as shown in FIG. 5.

The front trailer unit 2 shown in the drawings affords a boat trailer. It embodies, in general, an elongated frame 4 mounted on a pair of wheels 5 and 6, with two cradles 7 and 8 mounted on the front and rear, respectively, of the frame 4. A trailer hitch 9, which is preferably adjustable, and which may be of any suitable type readily available on the market, is mounted on the front end of the frame 4 for operatively connecting the front trailer portion 2 to an automobile, or the like, in trailing relation thereto.

The rear trailer portion 3 shown in the drawings is a camping trailer of the general type shown in my aforementioned United States Patent No. 3,149,876. It embodies an elongated frame 10 mounted on a pair of wheels 11 and 12, with a body portion 13 mounted on the frame 10. The body portion 13 may be of any suitable type, such as, for example, a folding body portion of the type shown in my aforementioned U.S. Patent No. 3,149,876 affording living or sleeping quarters when in erected position. As will be appreciated by those skilled in the art, the rear trailer portion 3 is shown herein as being a camping trailer merely for purposes of illustration, and not by way of limitation, and, if desired, it may be any other suitable type of trailer, such as, for example, a suitable house trailer, or the like.

The frame 4 of the front trailer unit 2 includes two elongated, substantially straight side members 14 and 15 disposed in substantially parallel relation to each other. The side members 14 and 15 are preferably channel members, opening inwardly toward each other, with each embodying an upper flange 16 and a lower flange 17, FIG. 6. Three cross braces 18, 19, and 20 extend between the side members 14 and 15 and are secured thereto by any suitable means such as, for example, welding. They are spaced from the flanges 16 and 17 of the side members 14 and 15. The cross member 20 is disposed at the front end portion of the frame 4, and a forwardly bowed, substantially V-shaped rear cross member 21 extends between the side members 14 and 15 rearwardly of the cross member 18, FIG. 3. The rear cross member 21 affords a coupling member for connecting the front trailer portion 2 to the rear trailer portion 3, as will be discussed in greater detail presently.

The side members 14 and 15 taper inwardly and forwardly toward each other at the front end of the frame to afford a tongue 22, and the trailer hitch 9 is mounted on the front end of the tongue 22, FIGS. 1 and 2. The trailer hitch 9 shown in the drawings includes a coupling member 23, FIGS. 1, 2, and 8, the front end of which may be connected to a suitable complementary coupling member, not shown, on an automobile, or the like, for connecting the front trailer portion 2 to the automobile. The rear end portion of the coupling member 23 is disposed on an upstanding feed screw 24 journaled in suitable bearings 25 and 26 in a housing 27 of the trailer hitch 9, FIG. 8. The housing 27 is secured to the front end of the tongue 22 by any suitable means, such as, for example, welding, and the screw 24 may be rotated by any suitable tool, not shown, engaged in a drive socket 28 in the upper end of the screw 24, for thereby adjusting the vertical position of the coupling member 23 relative to the tongue 22.

Two elongated slide members 29 and 30, FIGS. 1–3 and 6, are mounted on the lower flanges 17 of the side members 14 and 15, respectively, of the frame 4. Each of the slide members 29 and 30 includes an outer vertical flange 31, an inner vertical flange 32, a lower flange 33 extending between the vertical flanges 31 and 32, and an upper flange 34 extending horizontally outwardly from the inner flange 32 and terminating in inwardly spaced relation to the outer vertical flange 31, FIG. 6. The slide members 29 and 30 are mounted on the side members 14 and 15 with the lower flanges 17 of the latter disposed between the horizontal flanges 33 and 34, in abutting engagement with the inner vertical flanges 32, and with the outer vertical flanges 31 of the slides 29 and 30 being disposed in abutting engagement with the outer faces of the side members 14 and 15, respectively. With this construction, the slide members 29 and 30 are securely held on the side members 14 and 15 of the frame 4, but are freely slidable longitudinally thereof.

The wheels 5 and 6 are disposed on opposite sides of the frame 4 and are rotatably mounted on respective ends of an axle 35 which extends therebetween, FIGS. 2 and 6. Two leaf springs 36 and 37 are mounted on the axle 35 inwardly of, and adjacent to the wheels 5 and 6, FIG. 6, and are secured to the bottom of the slide members 29 and 30 by suitable means such as shackles 38. Thus, when the slide members 29 and 30 are moved longitudinally of the side members 15 and 14 of the frame 4, the wheels 5 and 6 are correspondingly moved relative to the frame 4.

Two feed screws 39 and 40 extend between and are journaled in suitable brackets 41 mounted on and depending from the cross members 18 and 20 of the frame 4, FIG. 6. The feed screws 39 and 40 extend longitudinally of the frame 4 inwardly of and adjacent to the lower flanges 17 of the side members 14 and 15, respectively. The feed screws 39 and 40 extend through and are threadedly engaged with ears 42 which project inwardly from the slide members 29 and 30, respectively. With this construction, rotation of the feed screws 39 and 40 is effective to cause the slide members 29 and 30 to be moved along the side members 14 and 15 of the frame 4, to thereby correspondingly move the wheels 5 and 6 relative to the frame 4.

Rotation of the feed screws 39 and 40, for adjusting the position of the wheels 5 and 6 relative to the frame 4, may be effected by any suitable means. However, I prefer to afford a handle 43 on the front end of the feed screw 40, forwardly of the tongue 22, FIGS. 1 and 2, for this purpose.

Two sprocket wheels 44 and 45 are mounted on and secured to the feed screws 39 and 40, respectively, and an endless sprocket chain 46 is trained thereover. Thus, when the feed screw 40 is rotated by the handle 43, it is effective to cause the feed screw 39 to rotate in the same direction, the sprocket wheels 44 and 45 and the sprocket chain 46 affording a drive connection between the feed screws 39 and 40 for this purpose.

The rear trailer portion 3, in general, is similar in construction to the front trailer portion 2. The frame 10 thereof embodies side members 47 and 48, FIG. 2, which are identical in construction to the side members 14 and 15. It also embodies two cross members 49 and 50, which are identical to the cross members 18–20, and extend between the side members 47 and 48 at the rear and front ends, respectively, of the frame 10.

Two slide members 51 and 52, which are identical in construction to the slide members 29 and 30 are mounted on the side members 47 and 48 of the frame 10 in the same manner as the slide members 29 and 30 are mounted on the side members 14 and 15. The wheels 11 and 12 are disposed on opposite sides of the frame 10, and are disposed on opposite ends of an axle 53, with the axle 53 connected to the slide members 51 and 52 by means of leaf springs 54 and shackles 55 in the same manner that the axle 35 is connected to the slide members 29 and 30 by the leaf springs 36 and 37 and the shackles 38.

Two feed screws 56 and 57 are mounted on the cross members 49 and 50 of the frame 10 in depending relation thereto by suitable brackets, not shown, which are the same as the brackets 41 on the front trailer portion 2. The feed screws 56 and 57 extend through and are threadedly connected to ears 58 and 59 which project inwardly from the slide members 51 and 52, respectively, so that rotation of the feed screws 56 and 57 is effective to cause the slide members 51 and 52 and, therefore, the wheels 11 and 12, to be moved longitudinally of the side members 47 and 48 of the frame 10.

A coupling member 60 in the form of a plate, having a square opening 61 in the front face thereof, is mounted on the front end of the feed screw 57. When the trailer portions 2 and 3 are in separated position, as shown in FIG. 5, the feed screw 57 may be rotated by any suitable tool, not shown, engaged in the recess 61 in the coupling member 60. The feed screw 57 is so disposed in the frame 10, and the coupling member 60 is so disposed thereon, that when the trailer portions 2 and 3 are secured in connected position relative to each other, as shown in FIGS. 1 and 2, the rear end portion of the feed screw 40 of the front trailer portion 2 is disposed in the recess 61 in the coupling member 60. The rear end portion of the feed screw 40 is complementary in cross-sectional shape to the recess 61 in the coupling member 60, and therefore, a drive connection is effected between the feed screw 40 and the feed screw 57 when the trailer portions 2 and 3 are disposed in assembled relation to each other.

Two sprocket wheels 62 and 63 are mounted on the feed screws 56 and 57, respectively, and an endless sprocket chain 64 is trained thereover, to thereby afford a drive connection between the feed screws 56 and 57.

Thus, when the feed screw 57 is rotated, the feed screw 56 is rotated thereby in the same direction by the drive connection afforded by the sprocket wheels 62 and 63 and the sprocket chain 64.

A forwardly bowed, substantially V-shaped cross member 65 extends between the side members 47 and 48 of the frame 10, at the front end thereof. It will be remembered that the rear cross member 21 is mounted on the rear end portion of the frame 4 of the front trailer portion 2. The front cross member 65 on the rear trailer portion 3 is complementary in shape to the rear cross member 21.

The rear cross member 21 on the front trailer portion 2 comprises a rearwardly opening channel member having an upper flange 66 and a lower flange 67, FIG. 4. Similarly, the front cross member 65 on the rear trailer portion 3 is a rearwardly opening channel member having an upper flange 68 and a lower flange 69. The cross member 65 is of such cross-sectional size that it may be received in the rearwardly opening cross member 21, with the flanges 68 and 69 disposed inwardly of and in juxtaposition to the flanges 66 and 67, FIG. 4.

When the trailer portions 2 and 3 are disposed in connected position relative to each other, the cross member 65 on the rear trailer portion 3 is disposed in the cross member 21 on the front trailer portion 2 substantially throughout its length. When the trailer 1 is in assembled condition, a plurality of pins 70 are removably mounted in and extend through aligned openings 71, 72, 73, and 74 in the flanges 66–69, respectively, FIG. 4 to thereby secure the two trailer portions 2 and 3 in such an assembled relation to each other. The pins 70 may be secured against accidental withdrawal from the openings 71–74 by suitable means such as cotter pins 75, FIG. 4.

A trailer hitch 76, which may be of any suitable type readily available on the market, is mounted on the front end portion of the frame 10 of the rear trailer portion 3, and projects forwardly therefrom to afford a member for coupling the rear trailer portion 3 to the rear end of an automobile, or the like, when the rear trailer portion 3 is to be hauled by such an automobile independently of the front trailer portion 2. As shown in the drawings, the trailer hitch 76 is preferably secured to a plate or cross member 77, which is mounted on the upper face of the front cross member 65 of the frame 10. The trailer hitch 76 is so disposed on the frame 10, that when the front and rear trailer portions 2 and 3 are secured in connected position relative to each other, the trailer hitch 76 terminates at its front end in rearwardly spaced relation to the rear cradle 8 on the front trailer portion 2, and it is disposed at such a height that when a boat, such as the boat 78 shown in FIG. 1, is carried on the front trailer portion 2, it is disposed above the trailer hitch 76. The tongue 65 and the trailer hitch 76 are preferably so positioned in the assembled trailer 1 that, if an outboard motor, not shown, were mounted in normal operative position on the boat 78, the lower end portion of the motor would extend into the tongue 65 rearwardly of the hitch 76.

In the operation of the towing device 1, when it is desired to afford a camping trailer-boat trailer combination, a boat, such as the boat 78, may first be mounted on the front trailer portion 2. Thereafter, the rear trailer portion 3 may be moved into connected position relative to the front trailer portion 2, wherein the front cross member 65 is disposed in operative position in the rear cross member 21, and the two trailer portions 2 and 3 may be secured in this position by inserting the pins 70 through the respective sets of openings 71–74. With the two trailer portions 2 and 3 thus secured together, they afford a singler trailer unit, wherein the frames 4 and 10 are immovable relative to each other, and form, in effect a single frame.

With the trailer portions 2 and 3 thus connected together, the pairs of wheels 5–6 and 11–12 may be adjusted into proper supporting position for the load carried by the frame of the overall trailer unit. This may be accomplished by turning the crank 43, which is effective to rotate the feed screws 39, 40, 56 and 57. The threads on the feed screws 56 and 57 are the reverse of those on the feed screws 39 and 40, so that rotation of the handle 43 is effective to move the pairs of wheels 5–6 and 11–12 either toward or away from each other. As will be appreciated by those skilled in the art, if it is desired to do so, the position of the pairs of wheels 5–6 and 11–12 may be adjusted prior to disposing the trailer portions 2 and 3 in assembled relation to each other, by individually manually rotating the feed screws 40 and 57. Preferably, the flanges 32 and 34, FIG. 6, on the slide members 51 and 52 terminate in sufficiently rearwardly spaced relation to the front ends thereof that the slides 51 and 52 may be moved forwardly past the junction of the tongue 65 with the main body portion of the frame 10, as shown in FIGS. 1 and 2. Similarly, the flanges 32 and 34 on the slide members 29 and 30 terminate forwardly of the rear ends thereof so that, if desired, the slide members 29 and 30 may be moved rearwardly past the junction of the rear cross member 21 with the main body portion of the frame 4.

Subsequently, if it is desired to haul the boat trailer 2 independently of the camping trailer 3, the camping trailer 3 may be disconnected from the boat trailer 2 by withdrawing the pins 70 from the openings 71–74 and backing the camping trailer 3 away from the boat trailer 2. The operator may then turn the crank 43 to thereby dispose the wheels 5 and 6 on the front trailer portion 2 in proper supporting position relative thereto, such as, for example, six to ten inches behind the center of gravity thereof, and the front trailer portion 2 of the towing device 1 is ready to be operated as a boat trailer independently of the rear trailer portion 3.

Similarly, if it is desired to use the rear trailer portion 3 independently of the front trailer portion 2, it can be disconnected from the front trailer portion 2 in the above-described manner, and the front trailer portion 2 may be disconnected from the automobile. Thereafter, the rear trailer portion 3 may be operatively connected to the automobile by means of the trailer hitch 76, and the operator may rotate the feed screw 57 to thereby adjust the wheels 11 and 12 into proper position for supporting the rear trailer portion 3, and the rear trailer portion 3 is then ready to be operated as a camping trailer independently of the front trailer portion 2.

With the pairs of wheels 5–6 and 11–12 being thus adjustable relative to the frames 4 and 10, respectively, they may always be disposed in proper position to afford good load supporting characteristics and good trailing characteristics irrespective to whether the trailer portions 2 and 3 are being used independently of each other, or are being used in assembled relation to each other wherein they afford a camping trailer-boat trailer combination.

From the foregoing it will be seen that the present invention affords a novel towing device which is effective to haul a plurality of different articles as a single trailer unit, and wherein the parts thereof afford effective individual trailer units which may be used independently of each other.

Also, it will be seen that the present invention affords a novel towing device of the aforementioned type which is practical and efficient in operation and which may be readily and economically produced commercially.

Thus, while I have illustrated and described the preferred embodiment of my invention, it is to be understood that this is capable of variation and modification, and I therefore do not wish to be limited to the precise details set forth, but desire to avail myself of such changes and alterations as fall within the purview of the following claims.

I claim:
1. A tow device comprising
   (a) two trailers,
   (b) each of said trailers including
      (1) an elongated frame having
         (a') front and rear ends, and
         (b') two elongated members extending longitudinally of said frame,
      (2) a pair of wheels spaced from each other transversely of the length of said frame, and
      (3) means mounted on said elongated members and operatively connected to said pair of wheels for supporting said frame on said wheels,
   (c) one of said frames having a rear end portion disposed between said elongated members thereof,
   (d) the other of said frames having a front end portion
      (1) disposed between said elongated members thereof, and
      (2) receivable in said rear end portion,
   (e) means operatively releasably connecting said front and rear end portions together in immovable relation to each other,
   (f) said first-mentioned means on said one frame being movable longitudinally of said elongated members on which they are mounted for adjusting the position of said wheels operatively connected thereto forwardly and rearwardly relative to said one frame,
   (g) said front and rear end portions comprising forwardly bowed elongated channel-shaped members having upper and lower flanges,
   (h) said flanges on said front end portion being disposed between said flanges on said rear end portion, and
   (i) said means releasably connecting said front and rear end portions together comprising elongated members mounted in said flanges of said channel-shaped members.

2. A tow device comprising
   (a) two trailers,
   (b) each of said trailers including
      (1) an elongated frame having
         (a') front and rear ends, and
         (b') two elongated members extending longitudinally of said frame,
      (2) a pair of wheels spaced from each other transversely of the length of said frame, and
      (3) means mounted on said elongated members and operatively connected to said pair of wheels for supporting said frame on said wheels,
   (c) one of said frames having a rear end portion disposed between said elongated members thereof,
   (d) the other of said frames having a front end portion
      (1) disposed between said elongated members thereof, and
      (2) receivable in said rear end portion,
   (e) means operatively releasably connecting said front and rear end portions together in immovable relation to each other,
   (f) said first-mentioned means on said one frame being movable longitudinally of said elongated members on which they are mounted for adjusting the position of said wheels operatively connected thereto forwardly and rearwardly relative to said one frame,
   (g) said first-mentioned means on both of said frames being movable longitudinally of said elongated members on which they are mounted for adjusting the position of said wheels operatively connected to the respective elongated members forwardly and rearwardly relative to said respective frames,
   (h) feed screws rotatably mounted on said frames and operatively connected to said first-mentioned means thereon for moving said first-mentioned means forwardly and rearwardly along said respective elongated members on which they are mounted,
   (i) said feed screws on said respective frames being releasably operatively connected to each other for rotation one by the other.

3. A tow device comprising
   (a) two trailers,
   (b) each of said trailers including
      (1) an elongated frame having
         (a') front and rear ends, and
         (b') two elongated members extending longitudinally of said frame,
      (2) a pair of wheels spaced from each other transversely of the length of said frame, and
      (3) means mounted on said elongated members and operatively connected to said pair of wheels for supporting said frame on said wheels,
   (c) one of said frames having a rear end portion disposed between said elongated members thereof,
   (d) the other of said frames having a front end portion
      (1) disposed between said elongated members thereof, and
      (2) receivable in said rear end portion,
   (e) means operatively releasably connecting said front and rear end portions together in immovable relation to each other,
   (f) said rear end portion comprising a forwardly bowed, elongated, rearwardly-opening, channel-shaped member having upper and lower flanges,
   (g) said front end portion comprising a forwardly bowed, elongated member disposed in said rear end portion between the flanges thereof, and
   (h) said means releasably connecting said front and rear end portions together comprising elongated members mounted in said front end portion and in said flanges of said channel-shaped member.

References Cited

UNITED STATES PATENTS

| | | | |
|---|---|---|---|
| 1,314,498 | 9/1919 | Bower. | |
| 1,621,555 | 3/1927 | Miller. | |
| 2,720,413 | 10/1955 | Halverson | 280—414 X |
| 3,004,772 | 10/1961 | Bohlen et al. | 280—415 |
| 3,102,738 | 9/1963 | De Roshia | 280—415 |
| 3,118,552 | 1/1964 | Behr | 280—414 X |
| 3,163,306 | 12/1964 | Bennett et al. | 280—415 X |

FOREIGN PATENTS 1,252,734  12/1960  France.

LEO FRIAGLIA, *Primary Examiner.*